CHEMICAL REACTOR

Filed May 29, 1961 2 Sheets-Sheet 1

INVENTORS
BRUCE E. DEAL
WILLIAM PETERSON
BY Christie, Parker & Hale
ATTORNEYS

CHEMICAL REACTOR

Filed May 29, 1961 2 Sheets-Sheet 2

INVENTORS
BRUCE E. DEAL
WILLIAM PETERSON
BY Christie, Parker & Hale
ATTORNEYS

United States Patent Office 3,098,763
Patented July 23, 1963

3,098,763

CHEMICAL REACTOR

Bruce E. Deal, Palo Alto, and William Peterson, San Francisco, Calif., assignors, by mesne assignments, to Raytheon Company, Lexington, Mass., a corporation of Delaware Filed May 29, 1961, Ser. No. 113,389
11 Claims. (Cl. 118—49.5)

This invention relates to apparatus for conducting chemical reactions, and more specifically to apparatus for reacting a chemical at the surface of a hot body.

Although the apparatus of this invention is suitable for conducting a variety of chemical reactions, it is especially suitable for depositing a metal, such as silicon, on a substrate, and is explained with reference to that specific application.

A recent and important development in the semiconductor field is the deposition of a layer of semiconductor material of relatively high electrical resistivity on a single crystal substrate of semiconductor material having a substantially lower electrical resistivity. The deposited layer of semiconductor continues the single crystal structure of the substrate, and for this reason the process is known as "epitaxial" deposition. Such deposition improves the operating characteristics of various types of semiconductor elements, such as silicon mesa transistors. For example, the epitaxial deposition of thin layers of relatively high resistivity semiconductor material on a low resistivity substrate of the same material provides a means of producing a transistor with essentially zero series collector resistance.

There are several ways in which semiconductor layers have been epitaxially deposited on a substrate. One of these includes thermal decomposition of a silicon compound in the vapor state with subsequent deposition of silicon on the substrate in a furnace. The most common technique has been to reduce silicon tetrachloride ($SiCl_4$) with hydrogen at a relatively high temperature, e.g., 1200° C. The reaction is represented by the following equation:

$$SiCl_4+2H_2\rightarrow Si+4HCl$$

One problem with the above technique is that the silicon tetrachloride tends to decompose into silicon in the furnace before it reaches the substrate. This often results in imperfect crystal growth of the freshly deposited layer.

The above problem is reduced to a certain extent by the use of an induction furnace to heat the substrate. However, the use of an induction furnace has the following disadvantages:

(1) Induction furnace equipment is expensive.

(2) It is difficult to achieve epitaxial deposition on a number of substrates simultaneously because the substrates must rest on a pedestal which is heated by the induction furnace coil and transfers its heat to the substrates. If a relatively large pedestal is used to hold a number of substrates, the pedestal must be especially constructed to obtain heating of the substrates so that proper deposition of the silicon is not impaired.

This invention provides apparatus in which the chemical to be reacted with a hot surface is delivered to the hot surface at a temperature substantially below that of the surface so that relatively little reaction of the chemical occurs until it is in the immediate vicinity of the surface. The invention makes possible the use of a conventional hot tube furnace, which is considerably less expensive than an induction furnace, and which can uniformly heat an almost unlimited number of substrates. Thus, with this invention, inexpensive conventional hot tube furnaces, which are standard equipment in practically all semiconductor plants, can easily be converted into inexpensive furnaces for epitaxial deposition work on a mass production basis.

Briefly, the invention contemplates apparatus for reacting a chemical at the surface of a hot body. The apparatus includes an elongated furnace tube in which the body is disposed, and heating means is disposed around the body for heating it in the furnace tube. A supply conduit extends into the furnace tube and has a discharge end disposed adjacent the body. Means are provided for delivering a stream of the chemical to the other end of the conduit to discharge a stream of the chemical into the furnace tube in the immediate vicinity of the hot body. Means are also provided for maintaining the supply conduit and stream of chemical in it at a temperature substantially below that of the heated body. With this arrangement, the chemical is prevented from undergoing premature reaction or decomposition, and the reaction of the chemical is confined to the immediate vicinity of the surface of the hot body where it has maximum effect.

In the presently preferred embodiment the supply conduit includes a cooling jacket through which a coolant is circulated to maintain the supply conduit and chemical stream in it at the desired relatively low temperature. In another form, the supply conduit is thermally insulated, and in yet another form, the exterior surface of the supply conduit is coated with a reflecting film such as silver, aluminum, or platinum for operation at higher temperatures.

Preferably, a flushing line is connected to the interior of the furnace tube to provide a flow of a flushing fluid independently of the chemical stream.

In coating a plurality of substrates simultaneously, the apparatus includes a covered boat in which the substrates are disposed. Preferably, the boat is open at opposite ends and the chemical stream is jetted from the end of the supply conduit into one end of the boat. These and other aspects of the invention will be more fully understood from the following description and the accompanying drawings in which.

Figure 1:
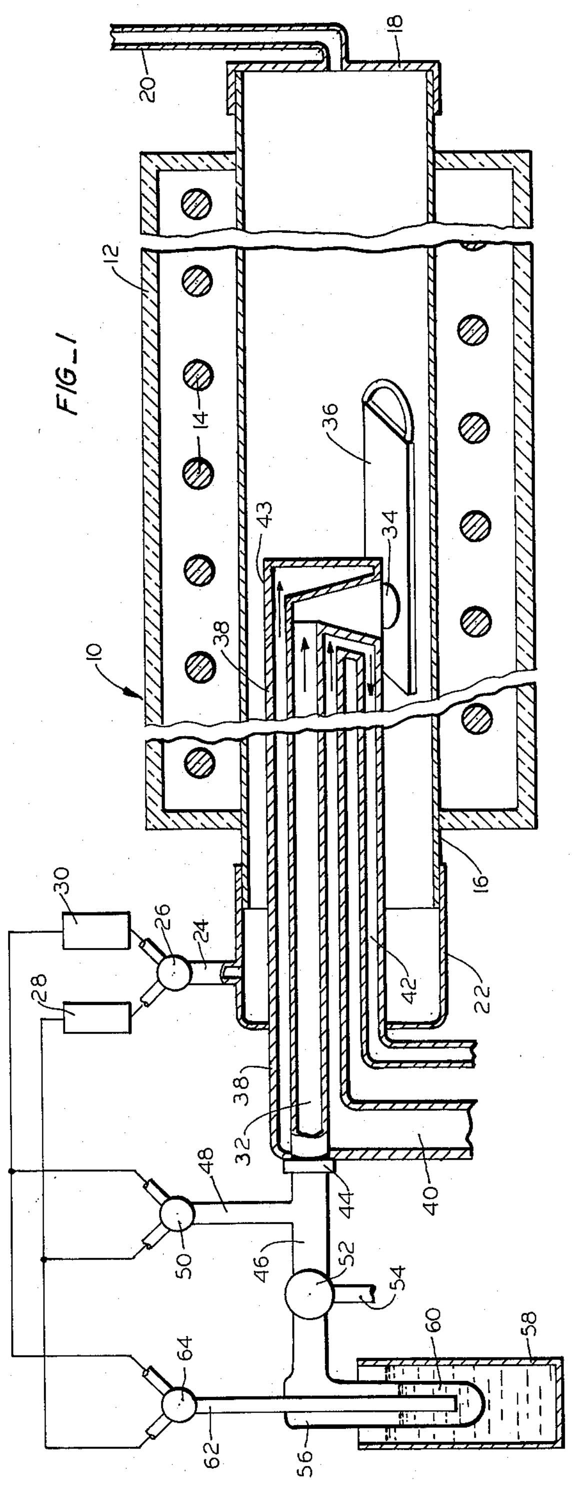
FIG. 1 is a schematic fragmentary elevation of one form of the invention.

Referring to FIG. 1, a conventional hot tube furnace 10 includes the usual hollow cylindrical refractory element 12 and the electrical heating elements 14. An elongated furnace tube 16 is disposed in the furnace element 12 to project from each end of it. The furnace tube may be made of any suitable material such as quartz or heat-resistant ceramic.

The right end of the furnace is closed with a cap 18 which includes a vent line 20 for the removal of gases at the discharge end of the furnace tube.

The left end of the furnace tube is closed by a cap 22 which includes a lateral line 24 connected through a two-way valve 26 to either a source 28 of hydrogen or a source 30 of a noble gas such as argon. A supply conduit 32 extends through the cap 22 a substantial distance into the furnace tube and furnace element. The right end of the supply tube turns downwardly to discharge over a body 34 resting on a boat 36. For the sake of explanation, it is assumed that the body is a silicon substrate in the form of a thin disk or slice on which a layer of additional silicon is to be deposited epitaxially. The boat may be of any suitable material, such as a refractory ceramic or quartz.

A cooling jacket 38 is disposed around the supply conduit for its entire length. A suitable coolant, say nitrogen gas, is introduced to the left end of the cooling jacket through an inlet line 40. Coolant is discharged from the right end of the cooling jacket back out through the cap 22 at the left end of the furnace tube. The exterior surface of the cooling jacket is coated with a platinum film 43 to aid in reducing the temperature of the supply conduit. The cooling jacket may be packed with suitable insulating material, say asbestos 43A (FIG. 2) to keep the supply conduit at a reduced temperature. The supply conduit is attached by a coupling 44 to a manifold 46 which in turn is connected through a lateral line 48 and a two-way valve 50 to the source of hydrogen or argon.

The manifold 46 is also connected through a two-way valve 52 to a vent line 54 or a conventional bubbler 56 emersed in a Dewar flask 58 containing a mixture of Dry Ice and trichloroethylene. Liquid silicon tetrachloride 60 is maintained in the bubbler 56 at a level above the lower end of a vertical tube 62 disposed coaxially in the bubbler 56. The upper end of the bubbler tube 62 is connected through a two-way valve 64 to either the source of hydrogen or the source of argon.

In an actual run to form epitaxial deposits of silicon, the furnace was a Hevi-Duty model G–02720 "Glo-Bar" hot tube furnace, which was about 26 inches in length with three heat zones—one zone in the center controlled by a thermocouple (not shown) connected to a conventional controller (not shown), and the two end zones connected in parallel.

The silicon slice used as a substrate was prepared similarly to that used for conventional transistor fabrication. It was sliced to a thickness of 13 mils, coarse lapped on both sides to 9 mils, and then polished to 8 mils. After a distilled water rinse, the slice was given a hot acetone rinse, two rinses of hot trichloroethylene, one rinse in warm isopropyl alcohol and dried. The slice was then oxidized one hour in steam at 1250° C. About 0.35 micron of silicon per side was oxidized, producing a total oxide thickness of about 0.7 micron. The oxide was then removed with a standard oxide etch. The oxidizing and etching procedure was used to remove any damage or surface imperfections caused by lapping or polishing, as well as to provide a cleaner surface. The silicon was single crystal n-type, antimony doped to a resistivity ranging between 0.01 and 0.05 ohm-cm.

The slice of silicon substrate, prepared as just described, was placed in the furnace under the discharge end of the supply conduit outlet, as shown in FIG. 1. The furnace tube was purged for about five minutes by flowing argon into the furnace tube through lateral line 24 and through the supply conduit through lateral line 48. The furnace was turned on to raise the temperature of the substrate to about 1250° C. The surface of the substrate was thereafter reduced at about 1250° C. in a stream of hydrogen for about 15 minutes at a flow rate of 3 l./m. through the supply conduit. Although not entirely critical, the inside diameter of the furnace tube was 40 mm. The supply conduit had an I.D. of 3 mm. and an O.D. of 4 mm. The cooling jacket had an O.D. of 6 mm. and an I.D. of 5 mm. Both the supply conduit and the cooling jacket were made of quartz.

Figure 3:
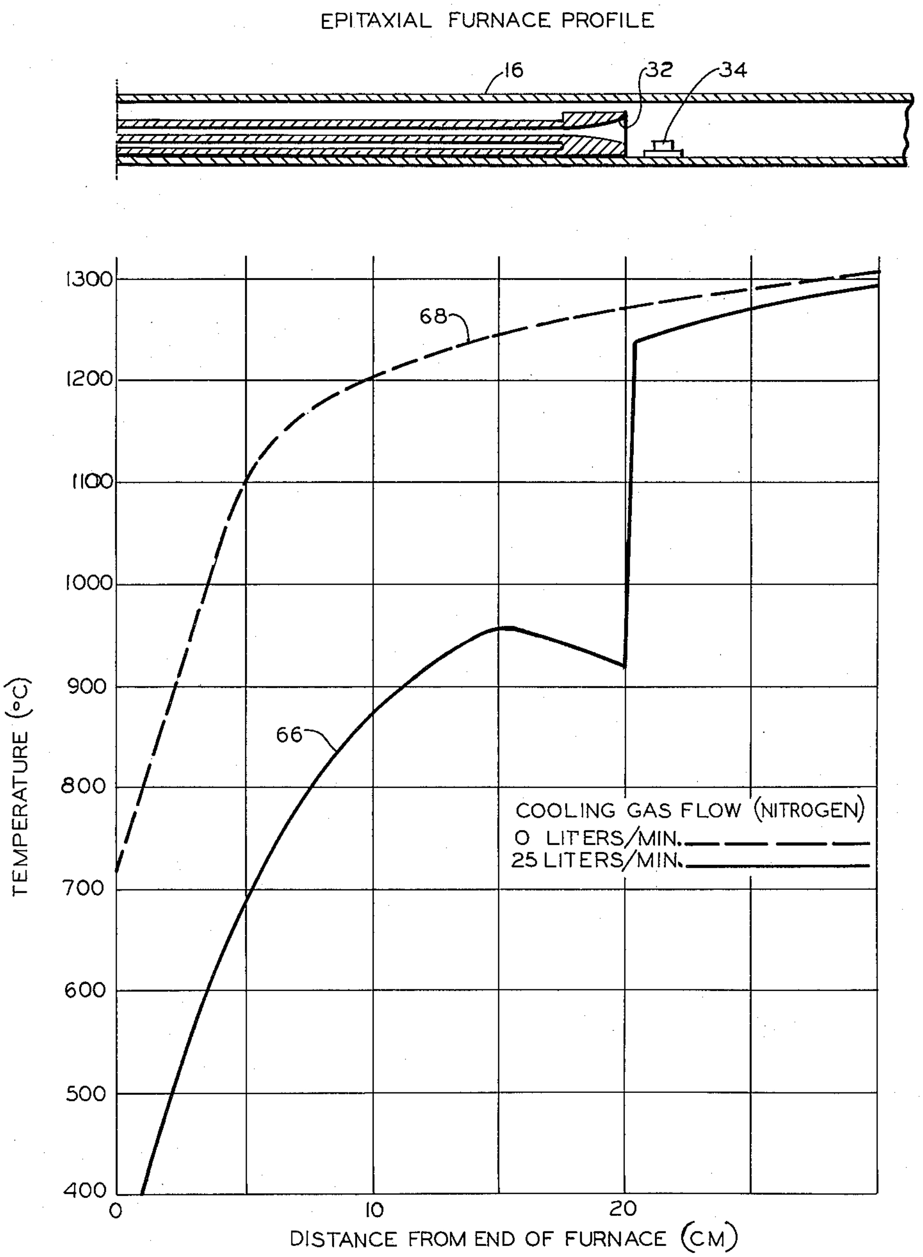
FIG. 3 is a plot showing the improved temperature characteristics obtained in a hot tube furnace utilizing this invention.

Hydrogen was then bubbled through the silicon tetrachloride, the latter being maintained at a temperature of about −25° C. The flow rate of the mixture of hydrogen and $SiCl_4$ vapors was found to have an optimum rate of about 1.5 l./m. for the specific system described. Hydrogen was also allowed to flow in through lateral line 24 around the outside of the supply conduit and cooling jacket at about 1 l./m. Nitrogen cooling gas was flowed through the cooling jacket at a rate of 25 l./m. This provided the temperature profile shown by the solid line curve 66 of FIG. 3, which shows that the temperature of the $H_2$—$SiCl_4$ mixture was maintained well below 1000° C. just before coming in contact with the silicon substrate. To aid in interpreting the temperature profile curve, the relative position of the furnace tube 16, supply conduit 32 and silicon substrate 34 are shown schematically at the top of the graph in FIG. 3. The dotted line curve 68 of FIG. 3 shows the temperature profile in the furnace with no cooling gas flowing through the cooling jacket. Without the cooling feature of this invention, the mixture of hydrogen and $SiCl_4$ would be sufficiently heated, say above about 1000° C., to react prior to reaching the silicon substrate, which should be located in the zone of the furnace tube with a temperature range of about 1200° C.-1300° C. for suitable epitaxial deposition of silicon. However, with the cooled supply conduit, the temperature of the $H_2$—$SiCl_4$ mixture increases step-wise, i.e., abruptly, in the immediate vicinity of the silicon substrate. With this arrangement, a substantial portion of the $SiCl_4$ decomposition takes place only in the immediate vicinity of the substrate surface to provide the necessary mono-crystalline growth required for satisfactory epitaxial deposition.

The deposition of the epitaxial layer of silicon was continued for 6 to 10 minutes to put down a layer with a thickness of 15–20 microns. The system was again purged with argon, and the sample was allowed to cool slowly as it was removed from the furnace. The finished product was found to be satisfactory epitaxially grown crystal and was made into a transistor.

Figure 2:
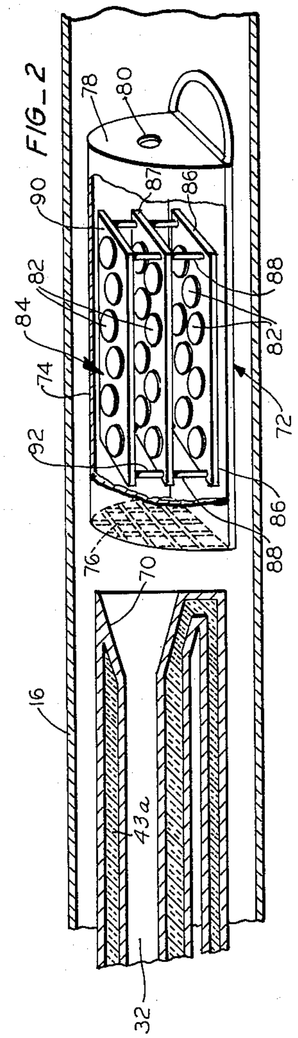
FIG. 2 is a schematic fragmentary elevation of an alternate embodiment of the invention.

FIG. 2 shows a modified system for making a plurality of epitaxial deposits simultaneously. The apparatus of FIG. 2 is identical with that of FIG. 1, except the supply conduit 32 discharges out of a nozzle 70 in a direction parallel to the longitudinal axis of the furnace tube and into one end of a boat 72 which includes a cover 74. The inlet end of the boat 72 is covered with a relatively loose mesh quartz grid 76 to break up the flow of gas mixture entering the boat and insure uniform distribution of the mixture throughout the boat. The discharge end of the boat is covered with a plate 78 which includes a centrally located orifice 80 to control the flow of gas from the covered boat. Epitaxial deposition runs were made under conditions similar to that described above, and it was found that the covered boat, inlet grid, and discharge orifice aided in a more uniform deposition on the plurality of substrate slices 82, which were mounted in a multiple plate rack 84 to effect a saving in space and obtain a more efficient utilization of the $SiCl_4$—$H_2$ mixture. As shown best in FIG. 2, the rack includes a bottom plate 86, a middle plate 87 with four legs 88 resting on the bottom plate, and a top plate 90 with four legs 92 resting on the middle plate. The silicon slices are disposed on each of the plates to provide high density packing of the slices and to get increased utilization of the gas mixture.

In the system shown in FIG. 2, the deposition time was increased slightly (8–15 minutes), and the flow rate of the $H_2$—$SiCl_4$ mixture was greater (3–4 l./m.).

One method of handling the epitaxial deposit after it is completed is to add a semiconductor impurity by conventional doping techniques. An alternate procedure is to add the impurity in the gas stream as the epitaxial crystal is grown. For example, boron tribromide is added to the $SiCl_4$ to introduce the boron impurity. In a similar manner, phosphorous trichloride may be added to the $SiCl_4$ to add phosphorous as an impurity.

One of the important advantages of this invention is that a conventional hot tube furnace can be used for epitaxial deposition of silicon with very little modification of the furnace as it is used in conventional semiconductor diffusion operations. The epitaxial deposits produced by the apparatus are reproducible with respect to deposit weight, thickness, and resistivity. Another advantage is that more than one silicon slice can be treated at one time without any temperature gradient problems because of the more uniform heating provided by a hot tube furnace.

Although the epitaxial deposition of silicon has been described to explain the operation of the apparatus, it is obvious that the apparatus can be used to conduct other chemical reaction, and to lay down other deposits such as $SiO_2$ on Si, germanium on gallium arsenide, Si on $SiO_2$, Si on Ge, Ge on Si, Si on steel or other metal surfaces for corrosion protection, etc.

We claim:

1. Apparatus for reacting a chemical at the surface of a hot body, the apparatus comprising an elongated furnace housing, a furnace tube disposed in the housing and adapted to hold the body in it, electrical resistance heating means disposed in the housing and around the tube for heating the tube and body, a supply conduit extending into the furnace tube and having one end terminate adjacent the body, means for delivering a stream of the chemical to the other end of the conduit to discharge a supply of the chemical into the furnace tube in the immediate vicinity of the body, a cooling jacket disposed around the supply conduit and extending into the furnace housing and into the heating means to terminate adjacent the said one end of the supply conduit, and means for flowing a coolant through the cooling jacket to keep the supply conduit and the chemical in it at a temperature substantially below that of the heated body.

2. Apparatus for reacting a chemical at the surface of a hot body, the apparatus comprising an elongated furnace housing, a furnace tube disposed in the housing and adapted to hold the body in it, electrical resistance heating means disposed in the housing and around the tube for heating the tube and body, a supply conduit extending into the furnace tube and having one end terminate adjacent the body, means for delivering a stream of the chemical to the other end of the conduit to discharge a supply of the chemical into the furnace tube in the immediate vicinity of the body, a cooling jacket disposed around the supply conduit and extending into the furnace housing and into the heating means to terminate adjacent the said one end of the supply conduit, means for flowing a coolant through the cooling jacket to keep the supply conduit and chemical in it at a temperature substantially below that of the heated body, and a heat reflecting film on the exterior of the cooling jacket.

3. Apparatus for reacting a chemical at the surface of a hot body, the apparatus comprising an elongated hot tube furnace in which the body is disposed, means for enclosing said body, resistive heating means disposed around the enclosing means containing the body for heating the body, a metal supply conduit extending into the enclosing means and having one end terminate adjacent the body, means for delivering a stream of the chemical to the other end of the conduit to discharge a supply of the chemical into the enclosing means in the immediate vicinity of the body, and thermal insulation disposed around the supply conduit for maintaining the supply conduit and stream in it at a temperature substantially below that of the heated body.

4. Apparatus for reacting a chemical at the surface of a hot body, the apparatus comprising an elongated hot tube furnace in which the body is disposed, means for enclosing said body, resistance heating means disposed in the furnace and around the enclosing means containing the body for heating the body, a metal supply conduit extending into the furnace tube and having one end terminate adjacent the body, means for delivering a stream of the chemical to the other end of the conduit to discharge a supply of the chemical into the enclosing means in the immediate vicinity of the body, and a heat reflecting film on the exterior of the supply conduit for maintaining the supply conduit and stream in it at a temperature substantially below that of the heated body.

5. Apparatus for reacting a chemical at the surface of a hot body, the apparatus comprising an elongated hot tube furnace in which the body is disposed, means for enclosing said body, heating means disposed in the furnace and around the enclosing means containing the body for heating the body, a metal supply conduit extending into the furnace tube and having one end terminate adjacent the body, means for delivering a stream of the chemical to the other end of the conduit to discharge a supply of the chemical into the enclosing means in the immediate vicinity of the body, means enclosing the supply conduit for maintaining the supply conduit and stream in it at a temperature substantially below that of the heated body, and means for flushing fluid through the furnace tube independently of the chemical stream.

6. Apparatus for reacting a chemical at the surface of a hot body, the apparatus comprising an elongated furnace tube, a covered boat disposed in the furnace tube to hold at least one said body, heating means disposed around the body for heating it in the boat, a supply conduit extending into the furnace tube and having a discharge end terminate adjacent the boat, means for delivering a stream of the chemical to the other end of the conduit to discharge a supply of the chemical into the furnace tube in the immediate vicinity of one end of the boat, means at said one end of said boat for uniformly distributing the chemical stream throughout said boat and means located at the other end of said boat for restraining the flow of the chemical from said boat, and means for maintaining the supply conduit and stream in it at a temperature substantially below that of the heated body.

7. Apparatus according to claim 6 in which the supply conduit is disposed to discharge the chemical stream in the same general direction as a line passing longitudinally through the ends of the boat.

8. Apparatus according to claim 7 in which said means at each end of said boat comprises openings wherein the opening nearer the discharge end of the supply conduit is larger than the other opening.

9. Apparatus according to claim 8 in which an open grid is disposed over the opening nearer the discharge end of the supply conduit to break up the stream of chemical entering the boat and the opening furthest from said discharge end comprises a centrally located orifice to control the flow of chemical from the boat.

10. Apparatus for reacting a chemical at the surface of a hot body, the apparatus comprising an elongated furnace tube in which the body is disposed, an elongated furnace disposed around the furnace tube for heating the body in it, said body being maintained in a covered boat disposed in said furnace, a supply conduit extending a substantial distance into the furnace and furnace tube and having one end terminate adjacent one end of said boat, means for delivering a stream of the chemical to the other end of the conduit to discharge a supply of the chemical into the furnace tube in the immediate vicinity of said boat, said boat having at one end thereof a grid for uniformly distributing the chemical stream throughout said boat and at the other end thereof means for controlling the flow of chemical from said boat whereby a pressure differential is maintained within said boat and means for maintaining the supply conduit and stream in it at a temperature substantially below that of the heated body.

11. Apparatus for reacting a chemical at the surface of a hot body, the apparatus comprising an elongated furnace tube, means for supporting a plurality of the bodies in the furnace tube with the said surface of each body being substantially parallel to the said surfaces of the other bodies, said supporting means comprising a covered boat having at one end thereof a grid and at the other end thereof a centrally located orifice, heating means disposed around the bodies for heating them in the furnace tube, a supply conduit extending into the furnace tube and having a discharge end terminating adjacent the bodies and extending in a direction as to be generally parallel to the said surfaces of the bodies, means for delivering a stream of the chemical to the other end of the conduit to discharge a supply of the chemical into the furnace tube in the immediate vicinity of the bodies, and means for maintaining the supply conduit and stream in it at a temperature substantially below that of the heated body.

References Cited in the file of this patent

UNITED STATES PATENTS

| | | |
|---|---|---|
| 2,487,581 | Palumbo | Nov. 8, 1944 |
| 2,587,036 | Germer et al. | Feb. 26, 1952 |
| 2,671,739 | Lander | Mar. 9, 1954 |
| 2,700,365 | Fawlyk | Jan. 25, 1955 |
| 2,778,743 | Bowman | Jan. 22, 1957 |
| 2,853,964 | Drewett | Sept. 30, 1958 |

FOREIGN PATENTS

| | | |
|---|---|---|
| 32,884 | Netherlands | June 15, 1934 |
| 970,474 | Germany | Sept. 25, 1958 |